(12) United States Patent
Temlyakov

(10) Patent No.: US 10,835,826 B1
(45) Date of Patent: Nov. 17, 2020

(54) SOCIAL PLAYER SELECTION FOR MULTIPLAYER ELECTRONIC GAMES

(71) Applicant: Amazon Technologies, Inc., Reno, NV (US)

(72) Inventor: Andrew Vladimirovich Temlyakov, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/647,128

(22) Filed: Jul. 11, 2017

(51) Int. Cl.
*A63F 13/795* (2014.01)
*A63F 13/798* (2014.01)
*A63F 13/30* (2014.01)

(52) U.S. Cl.
CPC ............ *A63F 13/795* (2014.09); *A63F 13/30* (2014.09); *A63F 13/798* (2014.09)

(58) Field of Classification Search
None
See application file for complete search history.

(56) References Cited

U.S. PATENT DOCUMENTS

| | | | |
|---|---|---|---|
| 7,819,749 B1* | 10/2010 | Fish | G07F 17/3227 463/42 |
| 7,828,661 B1* | 11/2010 | Fish | A63F 13/87 463/42 |
| 8,221,238 B1* | 7/2012 | Shaw | A63F 13/79 463/42 |
| 9,433,855 B1* | 9/2016 | Keeker | A63F 13/35 |
| 9,446,310 B2* | 9/2016 | Hoskins | A63F 13/25 |
| 9,630,114 B2* | 4/2017 | Hoskins | A63F 13/795 |
| 9,656,176 B2* | 5/2017 | Riego | A63F 13/12 |
| 9,700,803 B2* | 7/2017 | Hall | A63F 13/795 |
| 9,833,699 B2* | 12/2017 | Rouse | H04W 4/21 |
| 2003/0227479 A1* | 12/2003 | Mizrahi | A63F 13/80 715/753 |
| 2004/0210661 A1* | 10/2004 | Thompson | G06Q 30/02 709/228 |
| 2005/0070359 A1* | 3/2005 | Rodriquez | A63F 13/12 463/42 |
| 2005/0125382 A1* | 6/2005 | Karnawat | G06F 16/9535 |
| 2005/0198335 A1* | 9/2005 | Brown | H04L 67/1008 709/229 |
| 2006/0121990 A1* | 6/2006 | O'Kelley, II | A63F 13/35 463/42 |

(Continued)

*Primary Examiner* — Seng H Lim
(74) *Attorney, Agent, or Firm* — Hogan Lovells US LLP

(57) ABSTRACT

The dynamic selection of players for a gaming session, or users for an application session, can be based at least in part upon player relationship data. Social graph data can be maintained that indicates game experience that particular users have shared in prior game sessions. This relationship data can be used with other selection criteria, such as similar skill level or complementary play characteristics, to select players for a gaming session that are familiar to a specific player, enabling the player to have recurring experience with similar players in order to build relationships with those players and help to develop a sense of community within the game, which can improve the user experience and thus utilization of the game. Other factors can be considered as well, such as whether players have connected or blocked each other through a social network or gaming environment.

20 Claims, 8 Drawing Sheets

(56) References Cited

U.S. PATENT DOCUMENTS

| | | | |
|---|---|---|---|
| 2006/0135264 A1* | 6/2006 | Shaw | A63F 13/795 463/42 |
| 2006/0247055 A1* | 11/2006 | O'Kelley, II | A63F 13/795 463/42 |
| 2006/0248057 A1* | 11/2006 | Jacobs | G06F 16/9535 |
| 2006/0287096 A1* | 12/2006 | O'Kelley, II | A63F 13/12 463/42 |
| 2007/0156664 A1* | 7/2007 | Norton | G06Q 10/10 |
| 2007/0167225 A1* | 7/2007 | Nguyen | A63F 13/10 463/29 |
| 2007/0191101 A1* | 8/2007 | Coliz | A63F 13/12 463/42 |
| 2008/0045335 A1* | 2/2008 | Garbow | A63F 13/12 463/29 |
| 2009/0197684 A1* | 8/2009 | Arezina | G07F 17/3216 463/42 |
| 2010/0227691 A1* | 9/2010 | Karsten | G07F 17/32 463/42 |
| 2011/0250971 A1* | 10/2011 | van Os | A63F 13/795 463/42 |
| 2012/0015746 A1* | 1/2012 | Mooney | A63F 13/795 463/42 |
| 2013/0053149 A1* | 2/2013 | Rouse | H04W 4/21 463/42 |
| 2013/0165234 A1* | 6/2013 | Hall | A63F 13/00 463/42 |
| 2014/0128138 A1* | 5/2014 | Wickett | G07F 17/3237 463/13 |
| 2014/0274362 A1* | 9/2014 | Dhawan | G07F 17/3276 463/29 |
| 2014/0274404 A1* | 9/2014 | Hoskins | A63F 13/795 463/42 |
| 2015/0298007 A1* | 10/2015 | Agrawal | A63F 13/63 463/42 |
| 2016/0001181 A1* | 1/2016 | Marr | A63F 13/60 463/42 |
| 2016/0001186 A1* | 1/2016 | Marr | A63F 13/30 463/40 |
| 2016/0005270 A1* | 1/2016 | Marr | A63F 13/30 463/25 |
| 2016/0008720 A1* | 1/2016 | Inukai | A63F 13/795 463/29 |
| 2016/0279524 A1* | 9/2016 | Shaw | A63F 13/795 |
| 2016/0332074 A1* | 11/2016 | Marr | A63F 13/60 |
| 2017/0296930 A1* | 10/2017 | Hall | A63F 13/795 |
| 2017/0319968 A1* | 11/2017 | Craine | A63F 13/48 |
| 2018/0065047 A1* | 3/2018 | Marr | A63F 13/30 |
| 2019/0091581 A1* | 3/2019 | Reiche, III | A63F 13/795 |

* cited by examiner

SOCIAL PLAYER SELECTION FOR MULTIPLAYER ELECTRONIC GAMES

BACKGROUND

Users are increasingly playing electronic games in a networked context, allowing for multiple players to join a game session. Conventional multiplayer games select players for a particular session from a pool of available players, with the selected players having a similar rank or skill level. While such an approach can have advantages, as a player can play with other players of similar skill level even as the player's skill level changes, the player will frequently be matched with players who are unfamiliar to the player. Such an approach can make it difficult for a player to connect with the other players or develop camaraderie amongst the players. Further, being constantly matched with different players can prevent the player from learning to work as a team and balance out the strengths and weaknesses of other players.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for management of electronic gaming applications. In particular, various approaches provide for dynamic selection of players for a gaming session, or users for an application session, based at least in part upon relevant relationship data. Social graph data can be maintained that indicates an amount of time, number of times, or other metric representing game experience that particular users have shared in prior game sessions. This relationship data can be used with other selection criteria, such as similar skill level or complementary play characteristics, to select players for a gaming session that are familiar to a specific player, enabling the player to have recurring experience with similar players in order to build relationships with those players and help to develop a sense of community within the game, which can improve the user experience and thus utilization of the game. Other factors can be considered as well, such as whether players have connected or blocked each other through a social network or gaming environment, among other such options.

Various other functions can be implemented within the various embodiments as well as discussed and suggested elsewhere herein.

Figure 1:
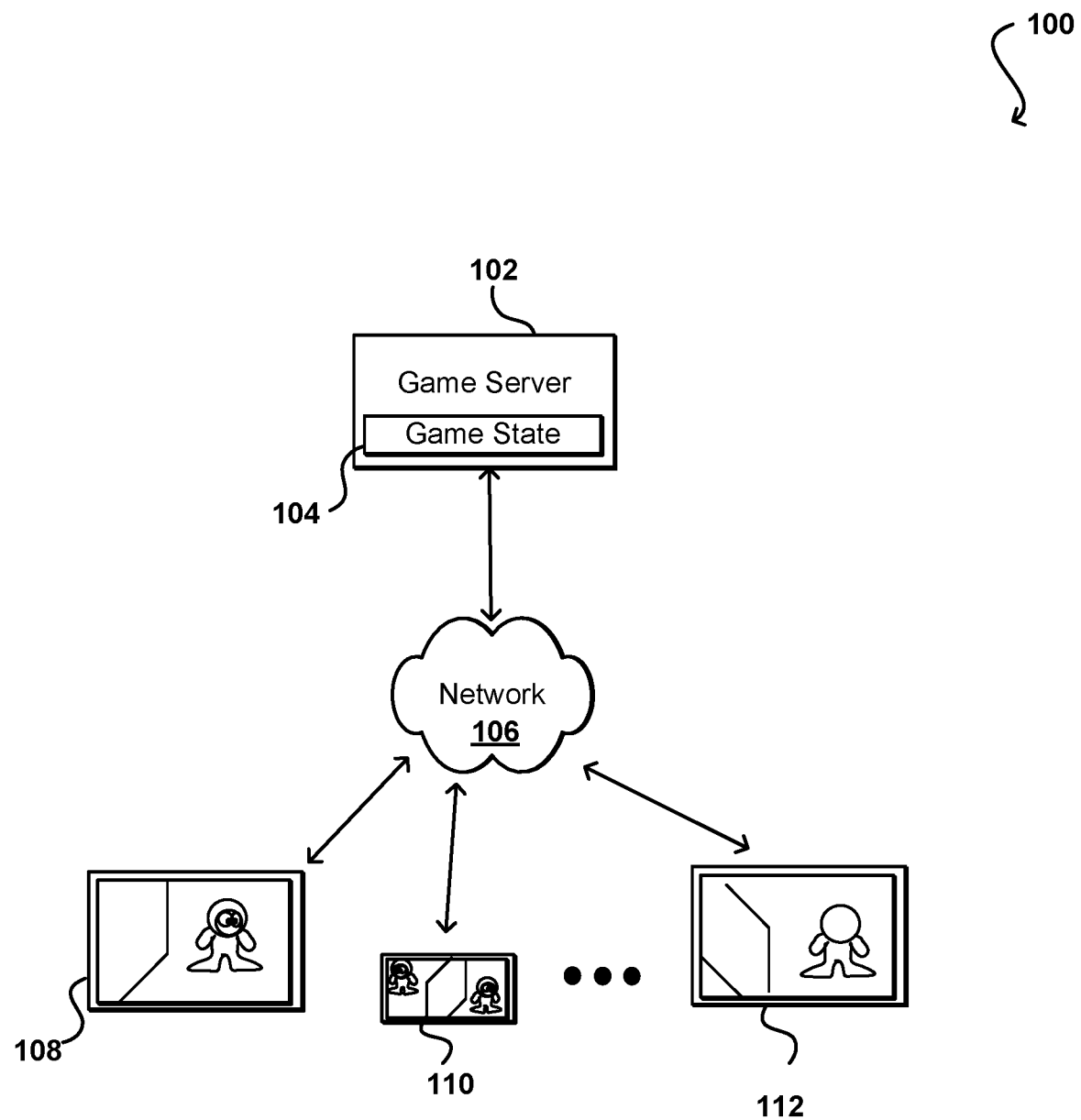
FIG. 1 illustrates players to a multiplayer gaming session that can be selected in accordance with various embodiments.

FIG. 1 illustrates an example gaming configuration 100 that can be managed in accordance with various embodiments. In this example, a gaming application is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. The players can join in a session of the game with state data that is managed by a game state component 104 of the game server. In some embodiments one or more game servers 102 can execute the game, while in others the servers can manage game state for instances of the game executing on the various player devices 108, 110, 112. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 102. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In some embodiments players may be added to game sessions in the order the requests are received or may be randomly assigned, among other such options. As mentioned, however, in other embodiments there can be specific criteria used to select one or more players to join a game session. Oftentimes players are selected based upon a current rank, rating, skill level, or other such metric associated with the player. As mentioned, this can be advantageous because a player can be matched with other players of similar skill level, such that the player does not feel that the game is too difficult or too easy, or just no fun, based on the skill of the other players. This is also advantageous, because as the player increases in skill then the players matched on the various game sessions will change to correspond to that skill level. A potential drawback to such an approach, at least for certain players, is that the players may otherwise be randomly matched such that it may be rare to play with the same player(s) in different sessions. Such selection approaches can take away from the social aspects of the games, particularly where the players are each joining the game session from different locations.

Approaches in accordance with various embodiments can attempt to improve social and other aspects of multiplayer gaming by matching players in ways that enable players to more frequently play with the same or similar players, or groups of players. Such approaches can help to facilitate friendships and communities within the game environment and the gaming community, as well as outside a game setting in at least some embodiments. Such approaches can build a sense of community amongst the gamers, which can improve the overall player experience and in turn power the success of the game itself.

In various embodiments, a set of relationships can be generated and maintained among the players registered for a game, or game provider, etc., which can then be used to select players for a particular game session or other such offering. In some embodiments the relationships can be used to create a virtual graph of players, referred to herein as a social graph, where players can be related to each other based upon factors such as the number of times the players have played together or the amount of time those players have played together, among other such options. The graph can be based upon other factors as well, such as may include the skill level or ranking of the players. The strength of the relationships can be based upon other factors as well, such as whether the players have connected as friends, indicated to not play together again, or have experienced a reasonable amount of success playing together, among other such options. When a player joins a game session, the relationships of that player according to the graph can be consulted to include, for example, players of a similar skill level that also have previously played a reasonable number of times with the joining player. The selection process can be configured to favor similar skill, playing time, new players, or other such variables, and the relative weighting of these factors can be set or adjusted over time. In some embodiments, the weighting factors can be adjusted using machine learning, for example, in order to provide an optimal gaming experience for the players selected for a gaming session.

In some embodiments, players can be plotted in a coordinate space that is appropriate for player selection. As an example, players may be plotted (virtually or otherwise) along at least one axis that relates to the player skill or ranking. Any of a number of dimensions can be used, where those dimensions can relate to aspects such as player age, experience, player type, device capabilities, and the like. Such a graph could be used to select similar players based on these objective factors. As mentioned, however, it can be desirable in at least some embodiments to add or utilize a social component with player selection. Accordingly, relationships can be mapped in this coordinate system, which will be referred to herein as "gamer space," to indicate that two players have played together in at least one session for a particular game, type of game, or set of games offered by at least one gaming provider, among other such options. In some embodiments information about the relationship can be stored for each link, referred to as a graph edge herein. In other embodiments, an aspect of the edge can be updated to reflect a level or strength of the relationship. For example, in the graph 200 illustrated in FIG. 2 the thickness of an edge can be indicative of the level of relationship, with thicker lines indicating stronger relationships due to the players playing together more often, friending or connecting each other in social media, etc. In some embodiments colors might be used to reflect players who have connected through the games or on social media, as well as players who have unfriended or blocked the other player, among other such options. It should be understood that terms such as user, player, and gamer may be used interchangeably herein for purposes of explanation but such usage should not be interpreted as a limitation on the scope of the various embodiments unless otherwise specifically stated. The selection of persons to join in various types of interactive experiences can benefit from approaches described and suggested within the scope of the various embodiments.

Figure 2:
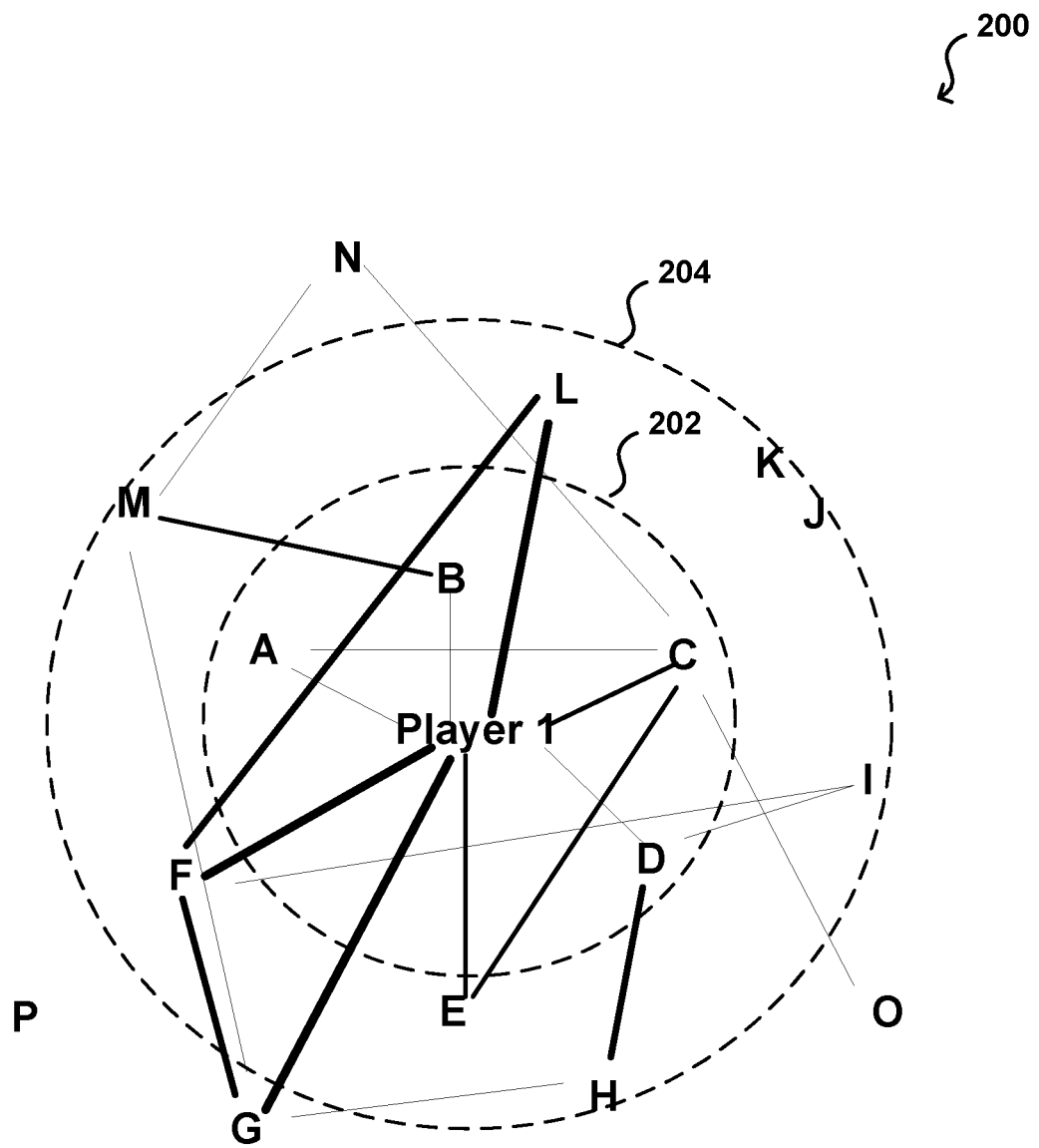
FIG. 2 illustrates an example social graph that can be generated and utilized in accordance with various embodiments.

In the example graph 200 of FIG. 2, players are plotted in gamer space according to, for example, their skill level or experience in a particular gaming environment. As illustrated, players such as players A and B may be considered to be similar players to Player 1 based on their proximity to Player 1 in gamer space, while players such as players O or P may be viewed as less similar. As mentioned, the skill level and other experience-based metrics can be updated over time such that the player's position in character space can be updated accordingly to reflect the most recent values. In some embodiments, a player selection approach can utilize the experience values to select players for a game, such as to attempt to select players within a first distance 202 of Player 1 in gamer space. This could represent, for example, players with similar skill, experience, or capabilities to that of Player 1, which might make for an enjoyable experience for the players as there will not be players who are much more experienced, and thus likely to win all challenges, for example, or players who are much less experienced, and thus likely to drag down the experience or cause the other players to have a less enjoyable experience or to be less competitive. If an insufficient number of players can be obtained within that distance range or threshold in gamer space, a different threshold 204 can be used iteratively or continuously until a sufficient number of players is obtained.

As mentioned, however, it also can be beneficial to attempt to select players with whom Player 1 has a gaming history. As mentioned, the thickness of the connecting edges can be indicative of a level of shared experience or prior teaming that can be used to select players for a game session in order to build relationships and a sense of gamer community. In some embodiments, the selection process can instead prioritize players by common experience in order to select players for a game session. In the example graph 200 of FIG. 2, players F, L, and G might be prioritized as having the most communal experience with Player 1 based at least in part upon edge thickness, followed by players E, C, and A, etc. Such an approach can thus be biased towards repeat selections, with additional players selected only if an insufficient number of players with prior relationships can be selected for a game based on availability or other such factors. Other criteria such as distance in gamer space can then be used to select players who have not previously played with Player 1. As mentioned, in some embodiments there can be a function (e.g., a weighted function) of these factors in order to get a combination of related players and highly similar players, in order to provide both a competitive and familiar experience. As mentioned, in some embodiments a player with a strong relationship might only be selected if within a threshold experience distance, such that players may be selected less often if they become significantly more, or less, experienced or skillful at a particular game, have a significantly different rank or rating, etc. Various optimizations can be used as well, including using machine learning to update the weightings of the various factors based upon user feedback or other such data. User feedback can be explicit, such as may include an indication that a user does not want to play with specific players anymore or indicates that they want to play with a different type of user or specific users. The feedback can also be implicit, such as when players quickly exit a session and attempt to join a different session, add players to an ignore list, flag players for repeat gaming, or take other such actions. Various other selection criteria and functions can be used as well as discussed and suggested herein within the scope of the various embodiments.

As mentioned, players can also perform specific actions which can cause specific players to be selected, or not selected, for a specific session. As mentioned, a player might friend, flag, or otherwise specify that another player is highly valued, at that the flagged player should be included in a gaming session for the specific player when possible. A selection function might then attempt to first select any or all of these players, or up to a specified number of these players, among other such options. A player might also block, unfriend, or otherwise indicate that the player does not want to play with a disfavored player in future sessions. In such an instance, that disfavored player may be removed from consideration for future sessions with the player, at least where other players are available to fill the minimum requirements for a session, etc. In some embodiments players may also be enabled to rate other players, where those rankings may be factored into the selection process as well. For example, a gaming server might select a first player who is less similar to a requesting player than a second player, but was more highly rated by the requesting player than the second player. Again, a weighted combination of these factors can be used in various selection approaches as discussed herein.

In some embodiments, an actual graph would not be created by the data would be generated and stored in one or more data tables or other such repositories. Each player can be assigned a player identifier, which can correspond to a row in at least one of the tables. The information for a given player may include a list of all players with whom the player has played in previous sessions, some indication of the level or amount of common experience, a current skill or experience level, and indication of players who have been friended or blocked by that player, among other such options. These tables can then be consulted and cross-referenced against available players from the player pool when attempting to select players to invite, add, or select for a session. In some embodiments the virtual graph can be walked from the Player 1 node along an identified path approach until a determined number of players is selected and added to the gaming session.

In some embodiments, the character aspects of a player can also be considered in selecting players for a session. For example, in a role playing game it might be desirable to include a variety of types of players, such as warriors, healers, sorcerers, etc., instead of players of a single type, as certain skills may be beneficial for the game. In some embodiments these selections can be performed by the game based on overall analysis or determinations, such as complementary player classes, or they can be made based upon the experience of specific players. For example, a player might be a strong warrior who takes a lot of damage and is thus best paired with at least one healer. Thus, the selection criterion can attempt to select the strongest healer available according to the selection criterion, which may include skill and relationship information as discussed herein. It may also be desirable to include a healer with higher skill level, if such selection will not negatively impact the enjoyment or experience of the healer player. In some embodiments the relative success of specific groups can be tracked, and attempts can be made to group those players in future sessions in order to improve the enjoyment of the players. Similarly, if a group becomes dominant in the game then it can be desirable to attempt to not group those players in future sessions so as to not negatively impact the experience of other players to the game. After each session (or during the sessions as appropriate), the information for the various players can be updated such that future selections utilize up to date information.

As additional players are added to a session, the relations of those players can be considered as well. For example, in the plot 200 of FIG. 2 Player B may be selected to play in a session with Player 1. This might then cause player M to be considered more strongly than before because, although player M has not prior experience with Player 1, player M has reasonable experience with Player B and is of closer skill level to player B. Thus, player M might be selected before player D, who has some experience with Player 1 but none with player B and is further away in skill level from Player B than player M. A combination or aggregation of distances between players, or average distance, etc., may be used for the selection. In some embodiments the distance may be multiplied by an experience factor corresponding to the thickness of the edge. Thus, a relatedness score might be a function of the distances to the already selected players for a session, where each respective distance is multiplied by an experience factor between the two players for the edge. The selection of players can then be attempted from the highest score to the lowest score in some embodiments until a sufficient number of players is selected and have joined onto the session. As mentioned, however, players can ask to join a session with all new players, all familiar players, specific players, or other such options.

In some embodiments a gaming system can also attempt to merge game session requests. For example, if twenty players request to start games that each require four players, then it might be easier to join these into five gaming sessions of four players than attempting to find players for twenty different sessions. This joining can be based upon similarity or other factors discussed herein, and can be automatic or may require permission from a player. For example, if a player requests to start a session but may instead advantageously be added to an existing session request, then the player might be asked whether the player would prefer to join a session about to start, or already started, rather than wait for enough players for a new session. In some embodiments the player may be given a list or set of options for such sessions, and may choose which one to join, among other such options. The willingness for players to join existing requests can also be stored as a selection mechanism or criterion in some embodiments.

Figure 3:
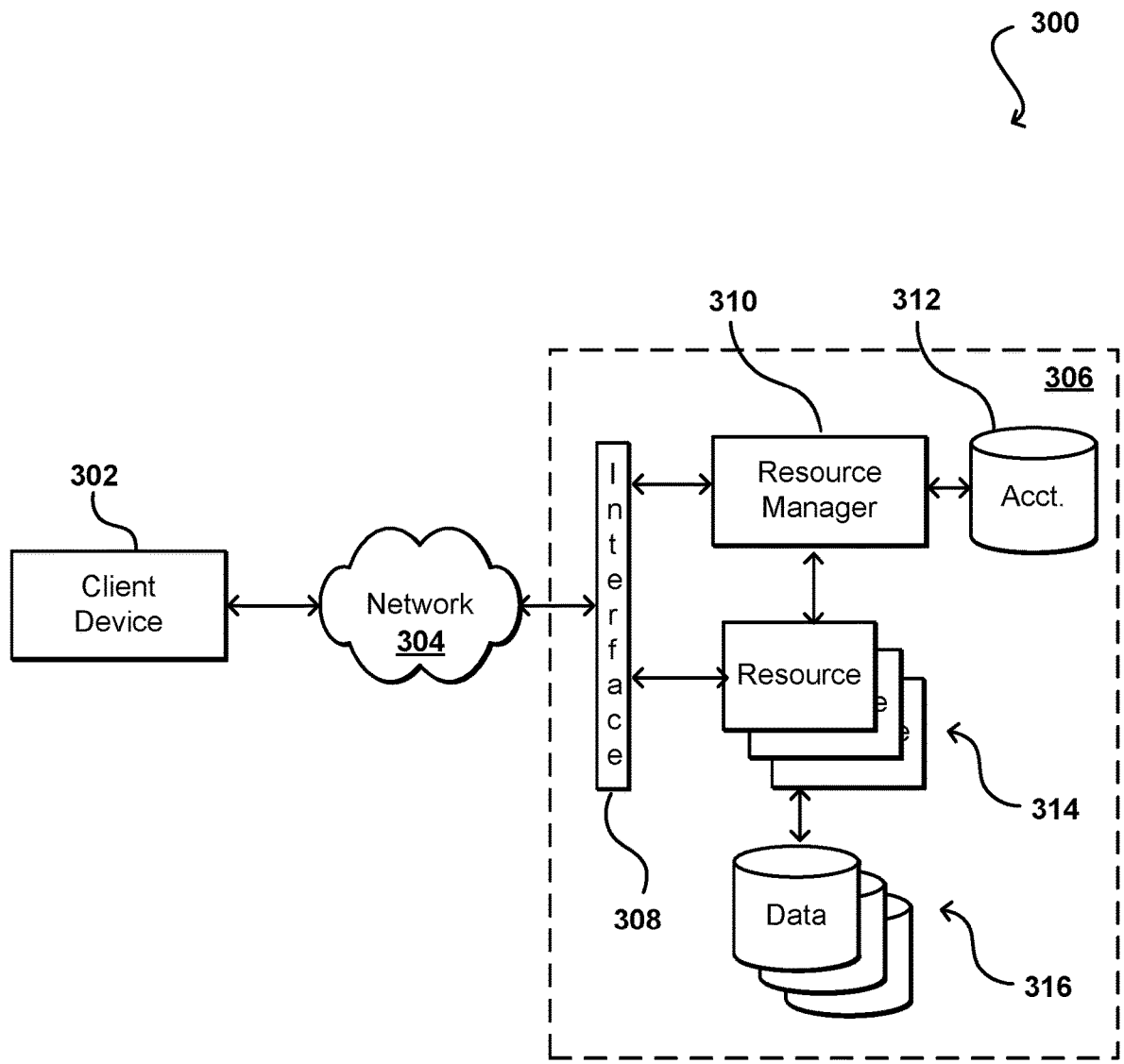
FIG. 3 illustrates an example environment in which various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
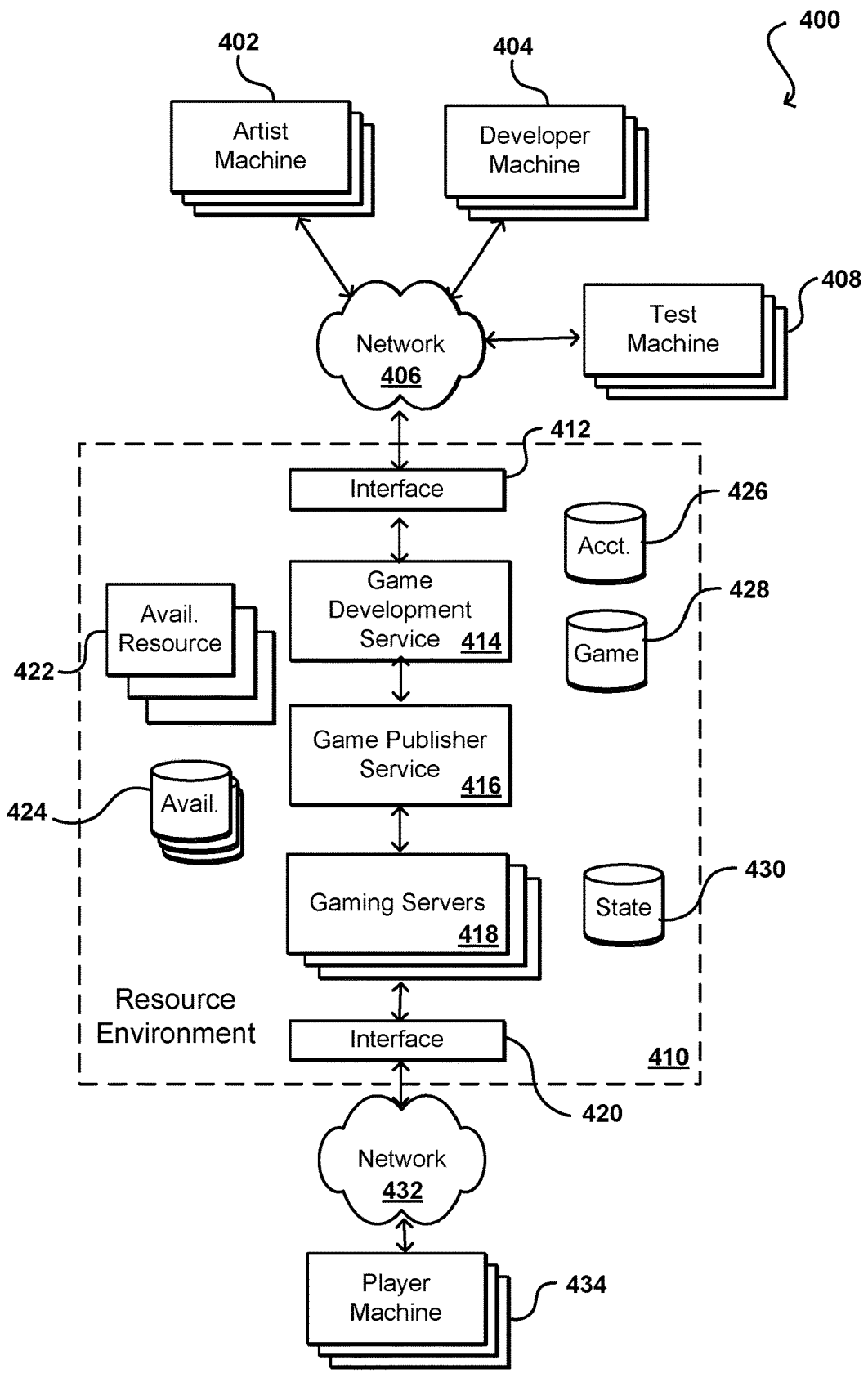
FIG. 4 illustrates an example gaming pipeline that can be used in accordance with various embodiments.

FIG. 4 illustrates an example environment 400 in which aspects of the various embodiments can be implemented. In this example, users are able to utilize various client device 402, 404 to submit requests across at least one network 406 to a resource provider environment 410. The client devices can include any appropriate electronic device operable to send and receive requests, messages, or other such information over an appropriate network and convey information back to a user of the device. Examples of such client devices include personal computers, tablet computers, smart phones, notebook computers, and the like. There may be different types of client devices used by different types of users, as different machines 402 might be appropriate for artists generating graphical content than machines 404 that would be appropriate for developers generating code. The at least one network 406 can include any appropriate network, including an intranet, the Internet, a cellular network, a local area network (LAN), or any other such network or combination, and communication over the network can be enabled via wired and/or wireless connections. The resource environment 410 can include any appropriate components for receiving requests and returning information or performing actions in response to those requests. As an example, the service provider environment might include computing resources 422, such as Web servers and/or application servers for receiving and processing requests, then returning content or information in response to the request. The environment can also include various repositories 424 that can be allocated for use by, or on behalf of, various users, customers, or applications of the environment.

In various embodiments, the resource environment 410 may include various types of electronic resources that can be utilized by multiple users for a variety of different purposes. In at least some embodiments, all or a portion of a given resource, or set of resources, might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 422 of one or more types. These types can include, for example, application servers operable to process instructions provided by a user or database servers operable to process data stored in one or more data stores 424 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a portion of the resources 422 can be allocated in response to receiving a request to an interface layer 412 of the resource environment 410. The interface layer can include application programming interfaces (APIs) or other exposed interfaces enabling a user to submit requests to the service provider environment. The interface layer 412 in this example can also include other components as well, such as at least one Web server, routing components, load balancers, and the like. When a request to provision a resource is received to the interface layer 412, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment and/or to a client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

A resource manager (or another such system or service) can also function as a virtual layer of hardware and software components that handles control functions in addition to management actions, as may include provisioning, scaling, replication, etc. The resource manager can utilize dedicated APIs in the interface layer 412, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 412 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, at least some of the resources are used to support platforms and services useful in the development and providing of electronic gaming and three-dimensional graphical content, among other such options. For example, the artist machines 402 and developer machines 404 can collaborate via a game development service 414, which can be provided by a set of resources in the resource environment 410 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 428, where the repositories can include graphics files, code, audio files, and the like. The game development service 414 can also work with an account manager, or at least maintain information in an account data store 426, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 416. The game publisher service 416 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 404 or otherwise. In some embodiments the game content might be published and made available to one or more test machines 408, which may be associated with the customer, such that the customer can test various builds or versions of the game. In some embodiments feedback provided by the test machines 408 may be provided to the game development service 414, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 418 which can run the game and enable player machines 434 to access the game content over one or more networks 432, which may be different from the network(s) 406 used for game development. This can include, for example, dedicated gaming networks, the Internet, cellular networks, and the like. The player machines 434 can communicate with the appropriate interfaces of an interface layer 420 to obtain the gaming content. In some embodiments the player machines 432 will download the gaming content for execution on the individual machines, and will upload (or otherwise communicate) gaming data, messages, and other information to the gaming servers 418, as well as to other players, social networking sites, or other such recipients. The gaming servers 418 can cause state information for the various instances of the game to be stored to at least one game state repository. This can hold state for the game as a whole or for individual game sessions, among other such options. In some embodiments the game content can be executed by the game servers and streamed in near real time to the player machines 434. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 5:
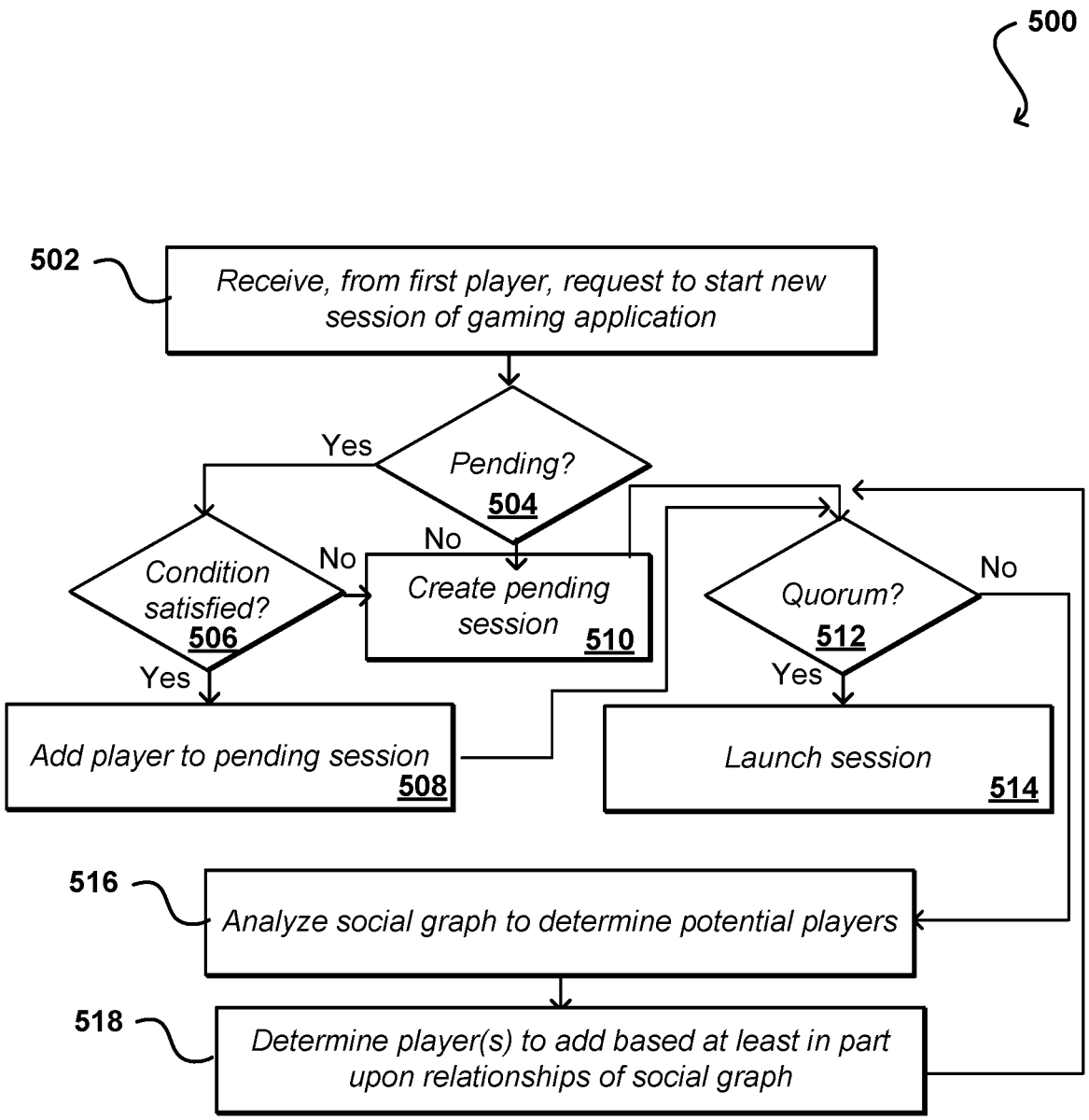
FIG. 5 illustrates an example process for adding players to a pending game session that can be utilized in accordance with various embodiments.

FIG. 5 illustrates an example process 500 for dynamically selecting players for gaming sessions that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a request is received 502 from, or on behalf of, a first player to start or join a new session for a gaming application hosted by one or more gaming resources in a shared resource environment. The request to initiate a new session for the gaming application can be received from a player device or console, or an administrator console, among other such options. The request can also be a specific request to start a new gaming session, or may be a request to join a new or pending gaming session, among other such options. A determination can be made 504 in this example as to whether there are any pending gaming sessions to which the first player can be added. These can include, for example, certain games in progress or games for which players are being selected or allowed to join but no gaming session has actually started, among other such options. In some embodiments one or more selection or joining criteria must be satisfied before the first player is added to a session, or eligible to be added, such as to have a certain skill level, range of experience, player type, etc. The first player may also need to have not been blocked or otherwise unfavorably friended by any of the players already added to the pending session. If there is at least one pending session, and it is determined 506 that the relevant criteria for that session are satisfied by the first player, then the first player can be added 508 to the group of selected players for the pending session.

If there are no pending sessions relevant to the request, or if the first player does not satisfy the criteria for the pending sessions, then a new pending session can be created 510. As mentioned, there may be a minimum number of players that need to join a session in some embodiments, such that the session may not start until at least that number have been added and are available to join in the session. In this example the execution of a gaming session by a game server hosting the gaming application can wait until it is determined 512 that there is a quorum of players for the gaming session, although in other embodiments a gaming sessions may be launched in response to the first player request but certain actions may wait until there is at least a quorum, etc. If it is determined there is at least a quorum of users, then the session can be launched 514, initiated, or otherwise made available for play by the selected players. If there is not yet a quorum, a relevant social graph can be analyzed 516 to determine potential players for the session, using an approach such as that discussed with respect to FIG. 6. One or more players to add to the session can then be determined 518 based at least in part upon the relationships determined from the social graph, as well as other factors such as similar skill level, complementary player types, and the like. The process can continue until at least a quorum of players is available and the session can start. As mentioned, in some embodiments the pending sessions can be analyzed to determine whether any sessions can be merged in order to start the relevant game for the players more quickly while still satisfying, or at least approximately satisfying, the relevant criteria for either pending session.

Figure 6:
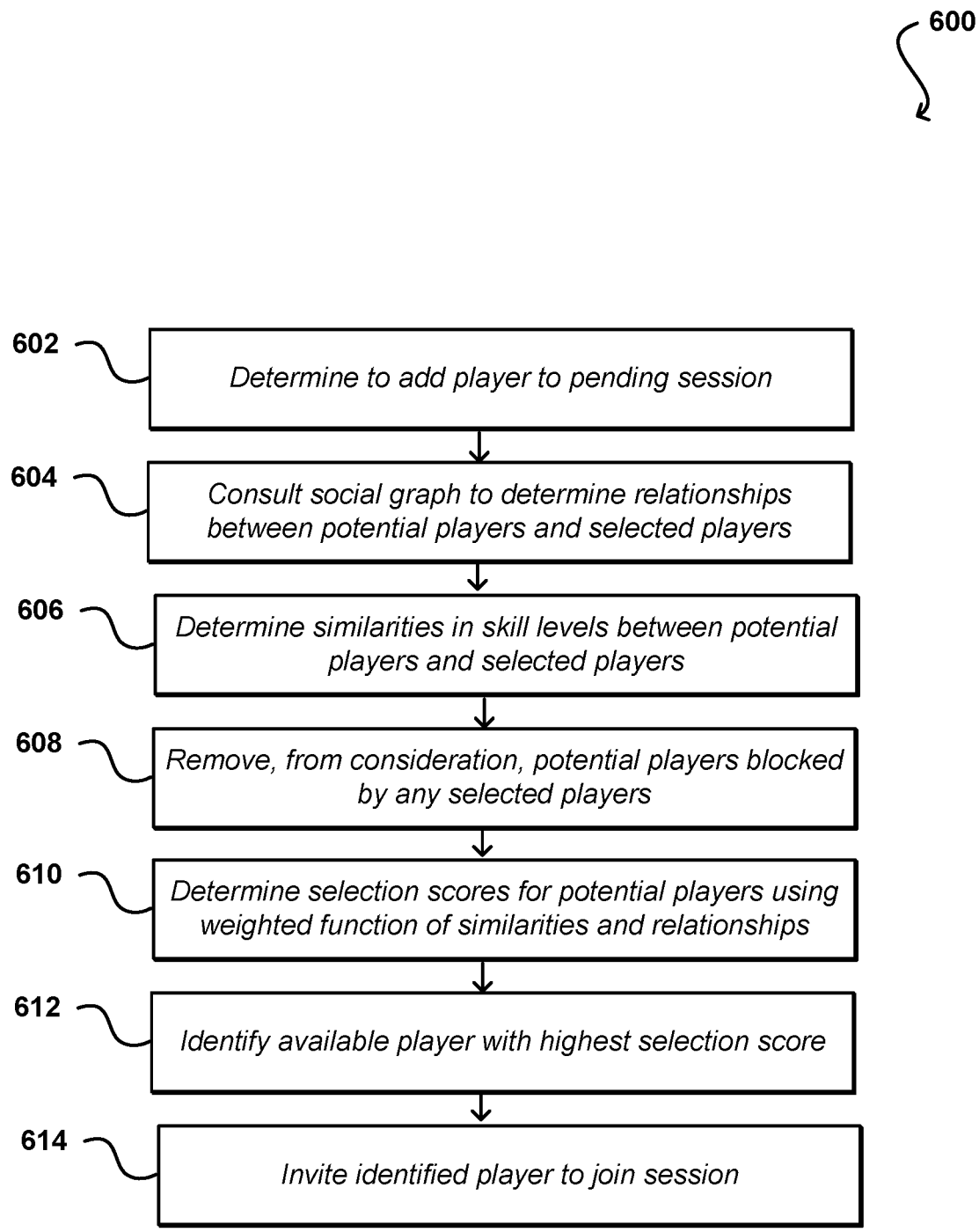
FIG. 6 illustrates an example process for determining a player to select for a pending gaming session that can be utilized in accordance with various embodiments.

FIG. 6 illustrates an example process 600 for selecting a player to join a pending session that can be utilized in accordance with various embodiments. In this example, a determination is made 602 to add another player, or additional players, to a pending session for a game or other application. As discussed with respect to the example of FIG. 5, this can include determining that a quorum of players has not yet been obtained for a pending session, among other such options. A relevant social graph for the gaming application can be consulted 604 to determine relationships between potential players and players already selected for the game. As mentioned, each player can be represented by a node in the social graph, and the relationships between those players based on prior gaming experience (or other such factors) can be represented by links or edges in the social graph. In addition to the relationships and other social information, similarities in skill levels or other player metrics can be determined 606 between the potential and selected players. The similarities can be determined from the social graph in some embodiments, while in other embodiments the similarities can be determined by consulting a player table or player profiles, among other such options. In this example, any potential player who has been blocked, unfriended, or otherwise unfavorably flagged by any of the already selected players can be removed 608 from consideration for addition to the gaming session. In this example, a potential player may represent a player who has a registered account with the gaming service and is online or otherwise determined to be available and/or interesting in joining a gaming session. For example, the player may have explicitly expressed interest or previously indicated to be notified of potential gaming opportunities, among other such options.

In this example, each remaining potential player (or at least a determined subset of those potential players) can have a respective selection score determined 610 with respect to the gaming session. As mentioned in more detail elsewhere herein, the score can be generated using a weighted function of the similarity scores and the relationship scores, which may be normalized in at least some embodiments to produce scores between, for example, 0 and 1. Once the scores are generated, the available player(s) with the highest selection score(s) can be identified 612, and those players can be invited 614 to join the pending session. Other factors can be included or considered in the selection function as well within the scope of the various embodiments. In some embodiments it may also be desirable to not always select the player with the highest score, but to select one or more players with lower scores in order to provide some variety and to give experience and relationships to new players, among other such options.

In some embodiments two or more similar social graphs can be maintained, including at least one for offline players as a ground truth version, and one for all online players. The online graph can be stored in memory to improve performance. When a player expresses interest in joining a game session, the data form the offline graph can be used to insert the player into the correct location on the online graph, in order to connect the player to people with whom the player is closest in the offline graph. A periodic job, running with a determined frequency, can then attempt to determine the best team on the graph and create a game session from the players, iterating through the various options. There can be many possible algorithms to use, as this can be similar to clustering or grouping on the graph, for example, and there are many clustering algorithms or approaches that can be utilized within the scope of the various embodiments. The graph can also be updated using, for example, player wait times. For players who have been waiting for a long time, their connections to other players may be increased in order to make it easier for those players to match in the next round or for the next session. When a match or session ends, the offline graph can be updated to reflect the new connections and/or data.

Figure 7:
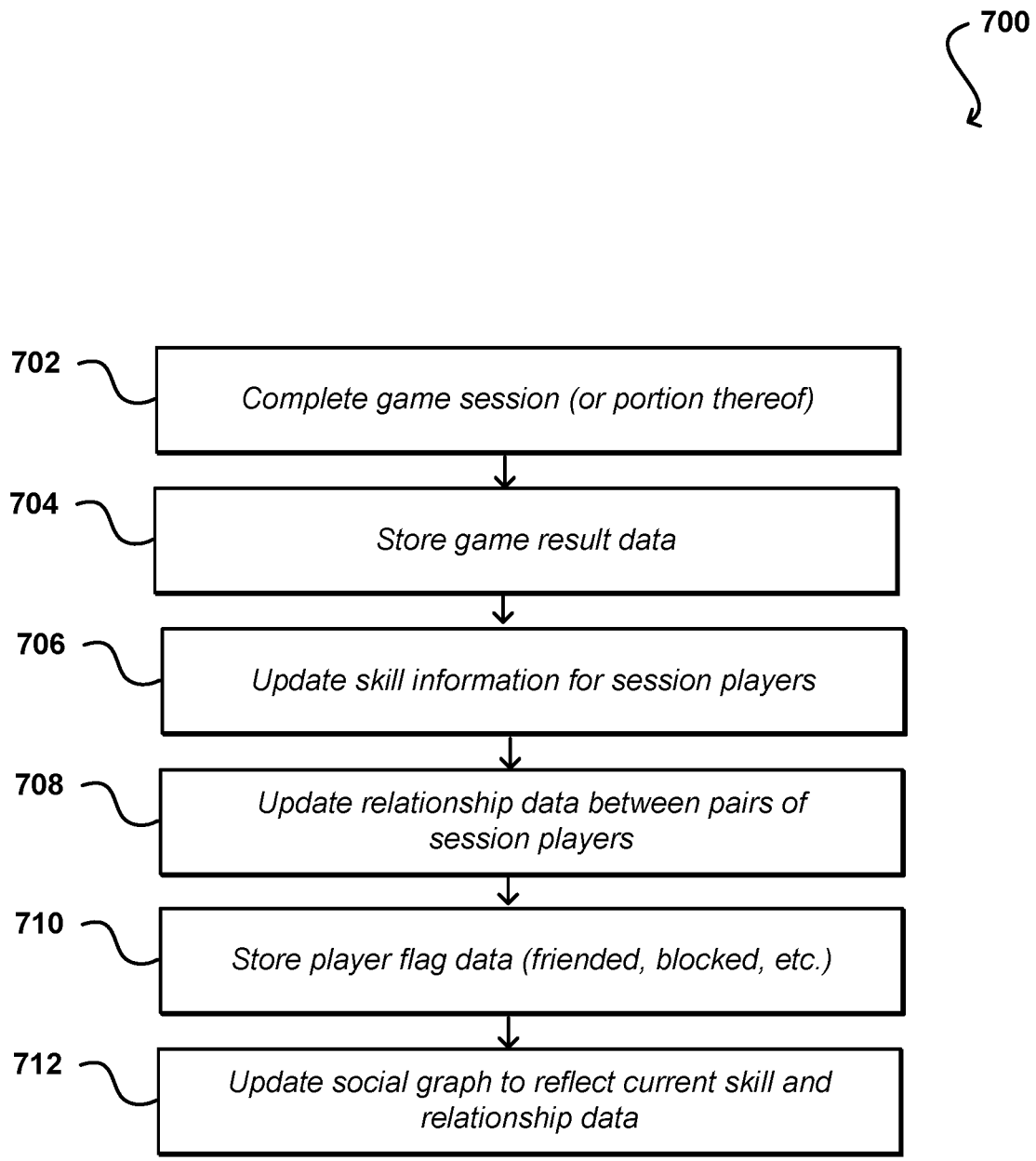
FIG. 7 illustrates an example process for updating a social graph upon completion of a gaming session that can be utilized in accordance with various embodiments.
Figure 8:
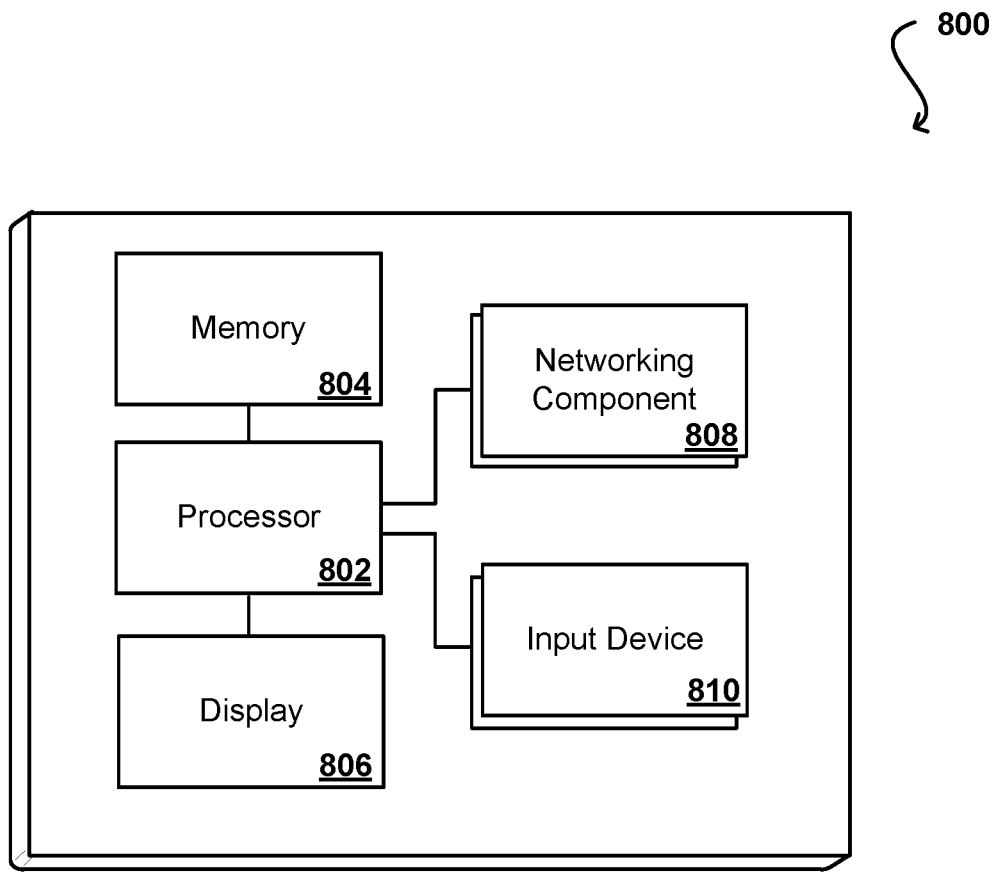
FIG. 8 illustrates example components of a computing device that can be used to implement aspects of the various embodiments.

FIG. 7 illustrates an example process 700 for updating a social graph after a gaming session, or after portions of a gaming session, that can be utilized in accordance with various embodiments. In this example, a game session (or designated portion thereof) is completed 702, and the relevant result data for the game can be stored 704 to a relevant location, such as a game data repository that stores information such as scores, experience, achievements, and the like. In addition to storing the game result data, the skill information for the relevant players can be updated 706 as appropriate. This can include, for example, experience points, new levels or skills obtained, tasks completed, achievements reached, and the like. Similarly, the relationship data between the pairs of players on the session can be updated. For players who have previously played together, this can include increasing the strength of the relationship based upon factors such as additional playing time together or an addition common session. For players who have not previously played together, this can include the creation of a relationship between those players. As mentioned, the relationships can be tracked by player identifiers in a player data table, among other such options. If any players were flagged during or after the session, such as to friend or block a specific player with respect to another player, then that player flag data can be stored 710 as well. The social graph for the respective game, gaming service, or gaming platform then can be updated to reflect some or all of this skill and relationship data, among other such options, as discussed in more detail elsewhere herein.

FIG. 7 illustrates a set of basic components of an example computing device 1000 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a social graph including a set of relationships, wherein the set of relationships includes a relationship between a first player and a second player, the relationship between the first player and the second player indicating a social connection between the first player and the second player and indicating that the first player and the second player both played in a first session of a game;
   receiving, on behalf of the first player, a request to initiate a second session for the game, the second session requiring at least a minimum number of players;
   identifying related players, from a plurality of players registered for the game, within a threshold range, the threshold range being dynamically adjusted based at least in part on implicit feedback from the first player corresponding to actions from previous gaming sessions, who are available to join the second session, who have previously played the game with the first player, and who have an associated player type that is complementary to a player type associated with the first player, wherein the related players include the second player;
   adding, to the second session, a subset of the related players who have a respective player ranking within a specified range of a first player ranking for the first player, the subset of the related players including the second player based on the relationship between the first player and the second player;
   adding, to the second session, at least one additional player, of the plurality of players, who has not previously played the game with at least the first player, the at least one additional player when combined with the first player and the subset of the related players constituting at least the minimum number of players for the second session;
   inviting the subset of the related players and the at least one additional player to join the second session;
   determining the minimum number of players has not joined;
   identifying second related players, from the plurality of players registered for the game, within a second threshold range, larger than the threshold range, who are available to join the second session;
   inviting at least one additional player from the second related players to join the second session; and
   initiating the second session of the game after the minimum number of players has joined.

2. The computer-implemented method of claim 1, further comprising:
   determining a minimum number of additional players to add to the second session, the first player having not previously played with the additional players, the minimum number capable of varying for each session of the game; and
   determining a number of related players to include in the subset of the related players based at least in part upon the minimum number of additional players.

3. The computer-implemented method of claim 1, further comprising:
   excluding a determined player, of the related players, from being added to the second session in response to the determined player being determined to have been blocked by the first player or another related player already added to the subset.

4. The computer-implemented method of claim 1, further comprising:
   adding, to the second session, an additional related player who has a respective player ranking within a specified range of a first player ranking and who has previously played with another related player of the subset of the related players added to the second session.

5. The computer-implemented method of claim 1, further comprising:
  determining whether the first player can be added to the second session being generated for the game before identifying the related players.

6. A computer-implemented method, comprising:
  determining a social graph including a set of relationships, wherein the set of relationships includes a relationship between a first player and a second player, the relationship between the first player and the second player indicating a social connection between the first player and the second player and indicating that the first player and the second player both played in a first session of a game;
  receiving a request to initiate a second session of the game;
  determining the first player to be invited to join the second session;
  analyzing the set of relationships, with respect to the first player, to determine additional players to invite to join the second session, the additional players being within a threshold range, the threshold range being dynamically adjusted based at least in part on implicit feedback from the first player corresponding to actions from previous gaming sessions;
  inviting the second player to join the second session based at least in part upon an analysis of the relationship between the first player and the second player and a determination that a player type associated with the first player is complementary with a player type associated with the second player;
  determining at least a minimum number of players have not accepted an invitation to join the second session;
  analyzing the set of relationships, with respect to the first player, to determine additional players to invite to join the second session, the additional players being within a second threshold range, larger than the threshold range;
  inviting a third player to join the second session; and
  initiating the second session after at least a minimum number of players accept the invitation to join the second session.

7. The computer-implemented method of claim 6, further comprising:
  analyzing the social graph to determine the set of relationships, the social graph representing the first player and the additional players as nodes, the relationships between pairs of players in the social graph represented by edges between the nodes.

8. The computer-implemented method of claim 7, further comprising:
  analyzing the edges between the players to determine respective strengths of the relationships; and
  determining the additional players to invite based at least in part upon the respective strengths.

9. The computer-implemented method of claim 8, further comprising:
  determining similarities in at least one of experience or skill between the first player and the additional players; and
  determining the additional players to invite based at least in part upon the respective strengths.

10. The computer-implemented method of claim 9, further comprising:
  generating a respective selection score, or players of a pool of potential players, based on a weighted combination of the similarities and the respective strengths of the relationships; and
  determining the additional players to invite based at least in part upon the respective selection scores.

11. The computer-implemented method of claim 6, further comprising:
  excluding a determined player, of the additional players, from being invited to join the second session in response to the determined player being determined to have been blocked by the first player or another related player already invited to the second session.

12. The computer-implemented method of claim 6, further comprising:
  determining that no pending session is available for the first player to join before determining to initiate a new gaming session.

13. The computer-implemented method of claim 6, further comprising:
  determining that a third session is currently inviting additional players;
  determining that the third session and the second session include invited players satisfying at least one similarity criterion; and
  merging the second session and the third session so that the invited players are able to join a common gaming session.

14. The computer-implemented method of claim 6, further comprising:
  completing the second session; and
  updating social graph data based at least in part upon additional relationship experience gained during the second session between the first player and the additional players.

15. A system, comprising:
  at least one processor; and
  memory including instructions that, when executed by the at least one processor, cause the system to:
    determine a social graph including a set of relationships, wherein the set of relationships includes a relationship between a first player and a second player, the relationship between the first player and the second player indicating a social connection between the first player and the second player and indicating that the first player and the second player both played in a first session of a game;
    receive a request to initiate a second session of the game;
    determine the first player to be invited to join the second session;
    analyze a set of relationships, with respect to the first player, to determine additional players to invite to join the second session, the additional players being within a threshold range, the threshold range being dynamically adjusted based at least in part on implicit feedback from the first player corresponding to actions from previous gaming sessions;
    invite the second player to join the second session based at least in part upon an analysis of the relationship between the first player and the second player and a determination that a player type associated with the first player is complementary with a player type associated with the second player;
    determine at least a minimum number of players have not accepted an invitation to join the second session;

analyze the set of relationships, with respect to the first player, to determine additional players to invite to join the second session, the additional players being within a second threshold range, larger than the threshold range;

invite a third player to join the second session; and initiate the second session after at least a minimum number of players accept an invitation to join the second session.

16. The system of claim 15, wherein the instructions when executed further cause the system to:

analyze the social graph to determine the set of relationships, the social graph representing the first player and the additional players as nodes, the relationships between pairs of players in the social graph represented by edges between the nodes.

17. The system of claim 16, wherein the instructions when executed further cause the system to:

analyze the edges between the players to determine respective strengths of the relationships; and determine the additional players to invite based at least in part upon the respective strengths.

18. The system of claim 17, wherein the instructions when executed further cause the system to:

determine similarities in at least one of experience or skill between the first player and the additional players; and determine the additional players to invite based at least in part upon the respective strengths.

19. The system of claim 18, wherein the instructions when executed further cause the system to:

generate a respective selection score, or players of a pool of potential players, based on a weighted combination of the similarities and the respective strengths of the relationships; and determine the additional players to invite based at least in part upon the respective selection scores.

20. The system of claim 16, wherein the instructions when executed further cause the system to:

exclude a determined player, of the additional players, from being invited to join the second session in response to the determined player being determined to have been blocked by the first player or another related player already invited to the second session.

* * * * *